United States Patent
Yang et al.

[11] Patent Number: 6,061,161
[45] Date of Patent: May 9, 2000

[54] DISTORTION-COMPENSATION CIRCUIT FOR WIDEBAND OPTICAL-FIBER COMMUNICATION SYSTEMS

[75] Inventors: Chien-Rong Yang, Taipei; Ren-Yuh Liang, Chupei, both of Taiwan

[73] Assignee: New Elite technologies, Inc., Chutung, Taiwan

[21] Appl. No.: 08/941,066

[22] Filed: Sep. 30, 1997

[30] Foreign Application Priority Data

Jun. 20, 1997 [TW] Taiwan ................................ 86108615

[51] Int. Cl.$^7$ ...................................... H04B 10/00
[52] U.S. Cl. ......................... 359/161; 375/296; 327/317
[58] Field of Search ................................... 359/161, 153; 375/256, 296, 278–279; 327/317, 133; 330/149

[56] References Cited

U.S. PATENT DOCUMENTS

| | | | |
|---|---|---|---|
| 5,132,639 | 7/1992 | Blauvelt et al. | 330/149 |
| 5,210,633 | 5/1993 | Trisno | 359/194 |
| 5,424,680 | 6/1995 | Nazarathy et al. | 330/149 |
| 5,481,389 | 1/1996 | Pidgeon et al. | 359/161 |

FOREIGN PATENT DOCUMENTS 276842 12/1984 China .

OTHER PUBLICATIONS

"Subcarrier Multiplexed Lightwave System Design Considerations for Subscriber Loop Applications", IEEE Journal of Lightwave Technology, vol. 7, No. 11, Nov. 1989.

*Primary Examiner*—Kinfe-Michael Negash
*Attorney, Agent, or Firm*—J. C. Patents; Jiawei Huang

[57] ABSTRACT

A distortion-compensation circuit for use on a wideband optical-fiber communication system is provided. This distortion-compensation circuit can compensate for the CSO/CTB (composite second order and composite third beat) distortions in the transmitted signals that are caused due to the intermodulation of undesired harmonics that are caused by nonlinear devices in the system. The distortion-compensation circuit includes splitting means, such as a directional coupler, for splitting the input signal into a first signal and a second signal. The first signal is directed to a first path, while the second signal is directed to a second path. A featured CSO/CTB generator is coupled on the second path to receive the second signal for selectively generating a compensating CSO/CTB output from the second signal. Further, combining means, such as another directional coupler, is arranged at the end of the first and second paths, for combining the compensating CSO/CTB output of the CSO/CTB generator with the first signal. The compensating CSO/CTB output can be used to offset the CSO/CTB distortions previously or subsequently generated in the optical fiber communication system.

11 Claims, 5 Drawing Sheets

DISTORTION-COMPENSATION CIRCUIT FOR WIDEBAND OPTICAL-FIBER COMMUNICATION SYSTEMS

BACKGROUND OF THE INVENTION

1. Field of the Invention

This invention relates to optical-fiber communication systems, and more particularly, to a distortion-compensation circuit for a wideband optical-fiber communication system which can compensate for the distortions in the transmitted signals caused by analog nonlinear devices in the system, allowing the transmitted signals essentially undistorted.

2. Description of Related Art

The optical-fiber systems are now widely used in all areas of communications, such as the cable television (CATV) systems, for simultaneous transmission of multiple frequency-division-multiplexed channels of signals and information. In a CATV system, it is desired that the power be increased so as to allow the broadcast signals to be transmitted to farther places to serve more subscribers, and the bandwidth and number of carriers be increased so as to increase the number of channels that can send more programs to the subscriber via a signal cable link. However, the distortions caused by nonlinear devices in the system are still a problem to the provision of high-quality picture transmissions.

In a CATV system based on multi-carrier analog communications, achieving the objective of high-quality picture transmission requires that the transmitted signals have low noise and distortions. To allow the transmitted signals to have low noise, one method is to increase the power of modulating signals so as to increase the signal-to-noise (S/N) ratio. However, this will also increase the distortions in the transmitted signals caused by the nonlinear characteristics of the light-emitting and receiving devices in the system.

Figure 1:
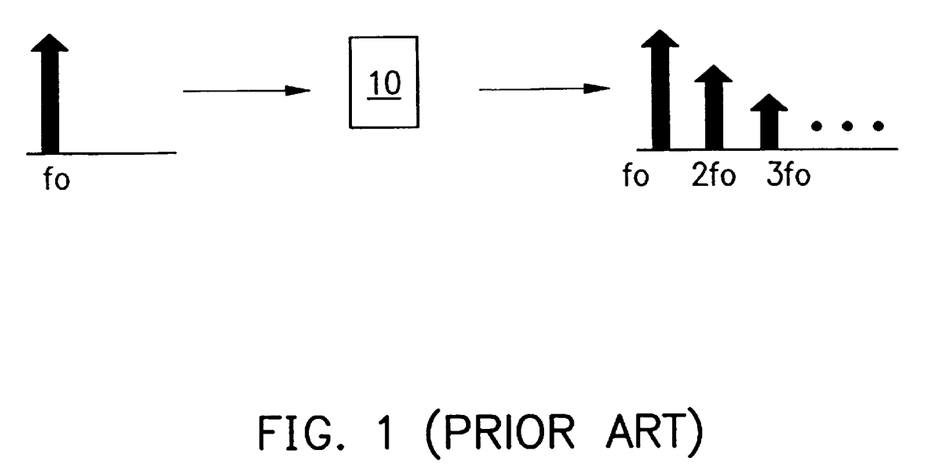
FIG. 1 is a schematic diagram used to depict the generation of a series of harmonic components to a sinusoidal RF or microwave signal after the signal passes through a nonlinear (optical or electrical) device.

In an optical system transporting a single radio-frequency (RF) or microwave carrier, any nonlinear optical or electrical devices will cause the generation of undesired harmonics to the carrier, as depicted in FIG. 1. As shown, when the carrier, which is a sinusoidal signal of a frequency $f_0$, passes through a nonlinear device 10, the output of the nonlinear device 10 will include an infinite series of harmonics whose frequencies are integral multiples of the frequency $f_0$ of the input signal (called fundamental frequency). The first-order harmonic has a frequency $f_0$ which is the same as the input signal; the second-order harmonic has a frequency $2f_0$; the third-order harmonic has a frequency $3f_0$; and so forth. The amplitude of these harmonics usually decreases as the order is increased. Normally, the amplitude of the fourth or higher order harmonics are small enough to be negligible. Therefore, typically, only the first three harmonics are significant for consideration.

In a multiple-RF(or microwave)-carrier system, the so-called composite second order (CSO) and composite triple beat (CTB) will arise due to the intermodulation among RF(or microwave) carriers passing through nonlinear devices in the system. The CSO and CTB will cause the so-called intermodulation distortions (IMD) which will deteriorate the quality of the transmitted information. For detailed background information on this, novice readers can refer to *IEEE JOURNAL OF LIGHTWAVE TECHNOLOGY*, Vol. 7, No. 11, November 1989.

The CSO and CTB will become more significant as the power or the number of RF(or microwave) carriers used in the system is increased. When the CSO and CTB are increased to a certain degree, the quality of the transmitted video information through the CATV system will be adversely affected. There exists, therefore, a need for a compensation means which can compensate for the CSO/CTB distortions.

A conventional method for compensating for the CSO/CTB distortions is to split the input signal into two parts: a first part of the input signal (hereinafter referred to as primary signal) which is directed to a first path (also called the main path) and a second part of the input signal (hereinafter referred to as secondary signal) which is directed to a second path. In particular, the second path is arranged with a so-called distortion generator that can compensate for the distortions such as CSO or CTB, or both. In the case of compensating for CSO distortion, a CSO distortion generator (which is also called a second-order circuit), such as that disclosed in ROC Publication No. 276842, is arranged on the second path. In a separate case of compensating for CTB distortion, a CTB distortion generator, such as that disclosed in the U.S. Pat. No. 5,210,633, is also arranged on the second path. Further, the final output of the second path and the final output of the first path are combined to obtain the difference therebetween, whereby the undesired CSO or CTB component can be cancelled.

Figure 2:
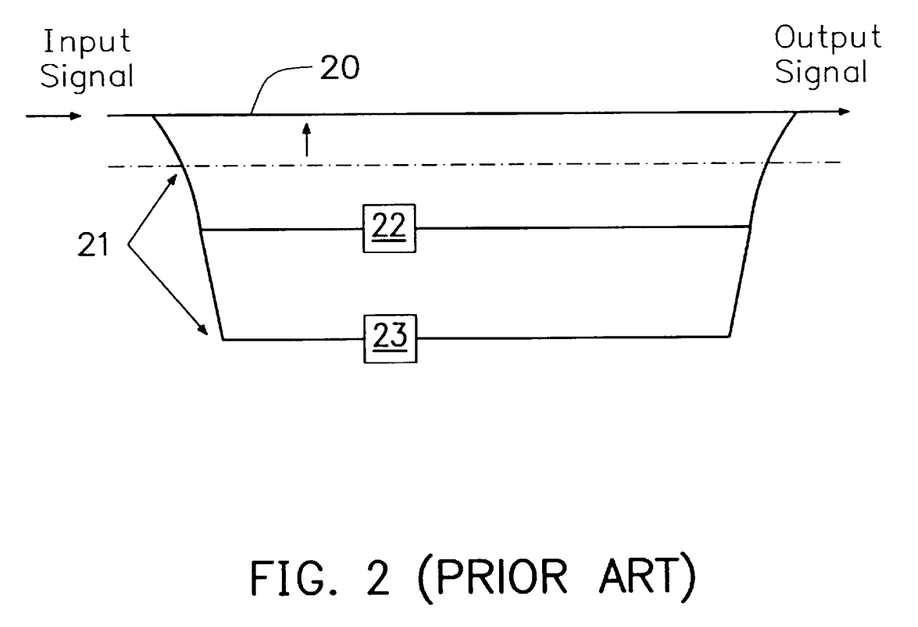
FIG. 2 is a schematic diagram of a conventional distortion-compensation circuit for compensating CSO/CTB distortions in an input signal.

Moreover, in the case of compensating for both of the CSO and CTB distortions, a third path is further added to the first and second paths mentioned above. The circuit configuration to deal with this case is schematically depicted in FIG. 2. As shown, the input signal is first split into two parts: a primary signal which is directed to a first path (main path) 20, and a secondary signal which is directed to a second path 21; and then the secondary signal is further split into a first subpart signal directed to a first subpath on which a CSO distortion generator 22 is arranged and a second subpart signal directed to a second subpath on which a CTB distortion generator 23 is arranged. The output of the CSO distortion generator 22 is used to offset the CSO component in the primary signal, while the output of the CTB distortion generator 23 is used to offset the CTB component in the same. This method can therefore compensate for both of the CSO and CTB distortions in the input signal. Conventional distortion-compensation circuits using this method are disclosed, for example, in the U.S. Pat. No. 5,132,639 and U.S. Pat. No. 5,424,680.

One drawback to the foregoing method, however, is that it requires the use of two separate distortion generators, i.e., one CSO distortion generator and one CTB distortion generator, which will cause the circuit configuration to be too complex. There exists, therefore, a need for a distortion-compensation circuit which includes only one distortion generator that can be variably adjusted to compensate for either a CSO distortion, or a CTB distortion, or both of the CSO and CTB distortions in the input signal.

SUMMARY OF THE INVENTION

It is therefore a primary objective of the present invention to provide a distortion-compensation circuit for a wideband optical-fiber communication system which is capable of compensating for the distortions in the transmitted signals caused by optical and electrical nonlinear devices in the system so as to allow the transmitted signals to maintain essentially undistorted.

It is another objective of the present invention to provide a distortion-compensation circuit for a wideband optical-fiber communication system which can be variably adjusted to compensate for either a CSO distortion, or a CTB distortion, or both of the CSO and CTB distortions in the input signal.

In accordance with the foregoing and other objectives of the present invention, a distortion-compensation circuit for a wideband optical-fiber communication system is provided.

Broadly speaking, the distortion-compensation circuit of the invention includes the following constituent elements:

(a) splitting means for splitting the input signal into a first signal and a second signal, said first signal being directed to a first path and said second signal being directed to a second path;

(b) a CSO/CTB generator, arranged on said second path to receive the second signal, for selectively generating a compensating CSO/CTB output; and (c) combining means, arranged at the end of said first and second paths, for combining the compensating CSO/CTB output from said CSO/CTB generator with the first signal, so that the compensating CSO/CTB output can be used to offset the CSO/CTB distortions previously or subsequently generated in the optical fiber communication system.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Principle of the Invention

In the following preferred embodiments, the distortion-compensation circuit of the invention is utilized on a wideband optical-fiber communication system for compensating for the CSO/CTB distortions in the transmitted signals. The principle of the invention will be first described in the following with reference to FIGS. 3 and 4.

Figure 3:
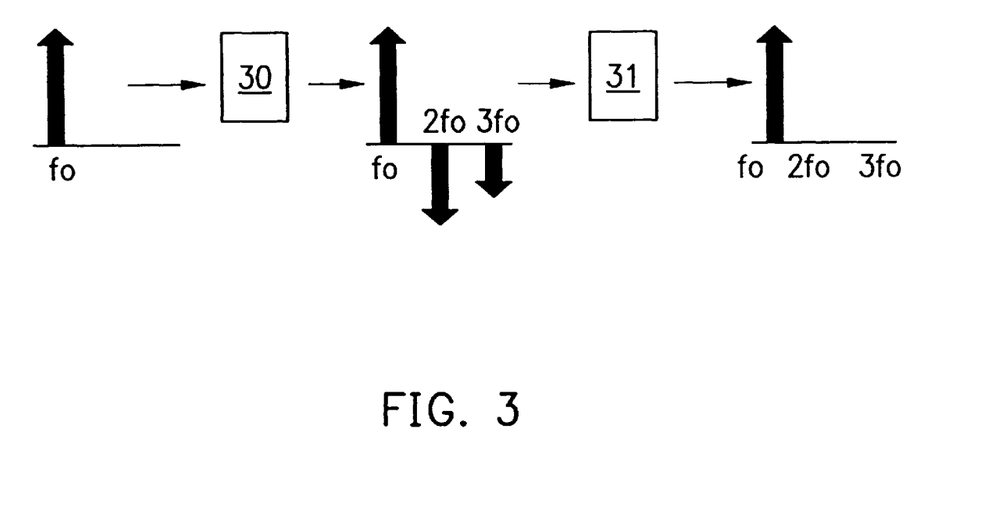
FIG. 3 is a schematic diagram used to depict the principle of a pre-distortion compensation circuit which is capable of canceling out the undesired harmonics caused by a nonlinear device.
Figure 4:
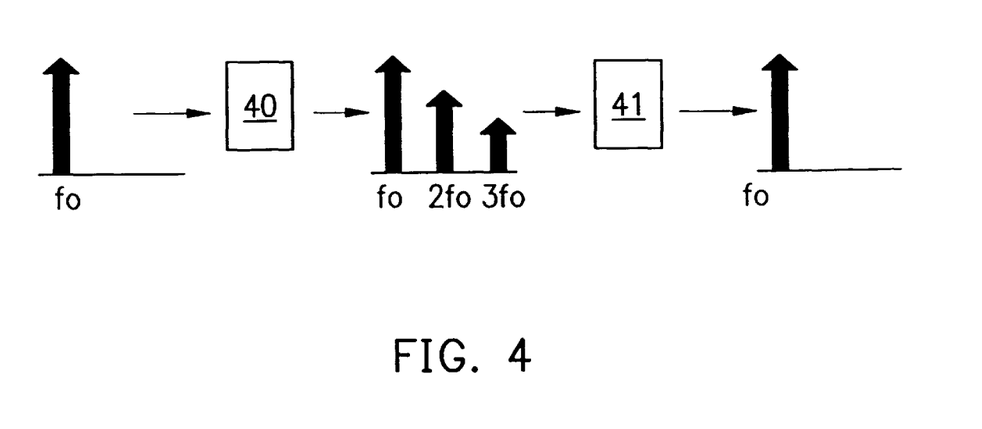
FIG. 4 is a schematic diagram used to depict the principle of a post-distortion compensation circuit which is capable of canceling out the undesired harmonics caused by a nonlinear device.

FIGS. 3 and 4 are schematic diagrams used to depict respectively the principles of a pre-distortion-compensation circuit and a post-distortion-compensation circuit which are capable of canceling out the undesired harmonics caused by a nonlinear device.

As described in the background section of this specification, when a sinusoidal signal of a frequency $f_0$ passes through a nonlinear device, such as a laser diode or an optical receiver in the wideband optical-fiber communication system, the output will be distorted to contain a series of harmonics whose frequencies are the integral multiples of the fundamental frequency. The spectrum of the output signal therefore has $f_0$, $2f_0$, $3f_0$ (the fourth-order harmonic and above are all negligible). The undesired harmonics of the second-order and the third-order can be cancelled out provided that they are combined with two sinusoidal components respectively of the frequencies $2f_0$ and $3f_0$ with the same amplitude but out of phase (inverse phase). This requires the design of a distortion generator which can, when receiving an input signal of a frequency $f_0$, pass through directly except little attenuated, a second-order harmonic of the frequency $2f_0$ but with inverse phase with respect to the fundamental frequency $f_0$, and a third-order harmonic of the frequency $3f_0$ also with inverse phase. When such a distortion generator is arranged in a preceding order to a nonlinear device, it is called a pre-distortion-compensation circuit; otherwise, it is called a post-distortion-compensation circuit.

As shown in FIG. 3, when a pre-distortion-compensation circuit 30 is arranged to receive an input signal of a frequency $f_0$ prior to being received by a nonlinear device 31, the output of the pre-distortion-compensation circuit 30 includes, as mentioned above, three harmonics, respectively of the frequencies $f_0$, $2f_0$, and $3f_0$ with the $2f_0$ harmonics being inverted in phase. After these harmonics pass through the subsequent nonlinear device 31, the two phase-inverted harmonics can cancel out the $2f_0$ and $3f_0$ harmonics caused by the nonlinear device 31.

Further, as shown in FIG. 4, when a post-distortion-compensation circuit 41 is arranged to receive the output of a nonlinear device 40 which receives an input signal of a frequency $f_0$, the $2f_0$ and $3f_0$ harmonics in the output of the nonlinear device 40 will be cancelled out by the two phase-inverted $2f_0$ and $3f_0$ harmonics generated by the post-distortion-compensation circuit 41. As a result, the output of the post-distortion-compensation circuit 41 includes only the fundamental harmonic of the frequency $f_0$. A conventional post-distortion-compensation circuit is disclosed in the U.S. Pat. No. 5,481,389.

In a multiple-carrier system, the $2f_0$ harmonic is related to CSO, while the $3f_0$ harmonic is related to CTB. The purpose of the distortion-compensation circuit of the invention is to cancel out the CSO/CTB components in the transmitted RF signal.

In the distortion-compensation circuit of the invention, the transmitted signal is split into a primary signal which is directed to a first path (the main path) and a secondary signal which is directed to a second path. Assume the power of the primary signal is X, then the secondary signal is a·X, where $0 < a < 1$. This can be achieved by using a directional coupler which can split its input into two apportioned outputs by a predetermined ratio.

In accordance with the invention, a number of diodes are used to construct a CSO/CTB generator, which serves as the primary constituent element of the distortion-compensation circuit of the invention, for generating compensating CSO and CTB that are used to offset the undesired CSO/CTB components in the transmitted signal.

Figure 5:
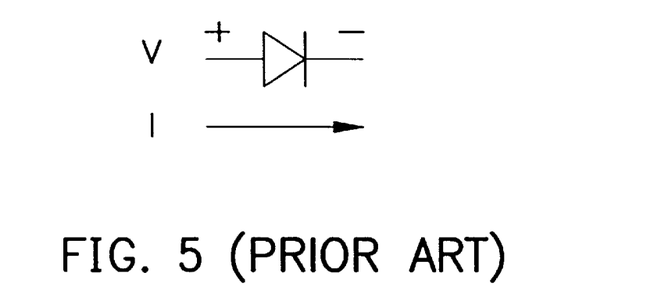
FIG. 5 is a schematic diagram of a forward-biased diode.
Figure 6:
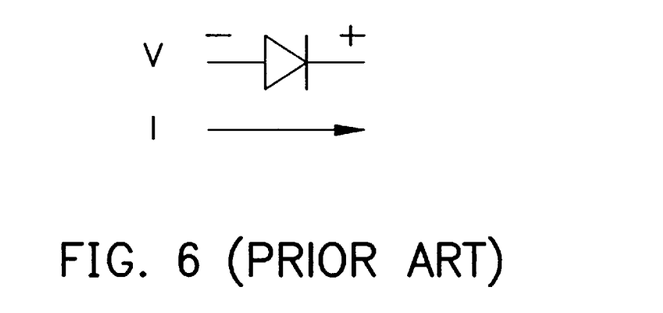
FIG. 6 is a schematic diagram of a reverse-biased diode.

FIG. 5 shows a diode which is forward-biased, while FIG. 6 shows a diode which is reverse-biased. It is well-known in the art of electronics that the current-voltage (I-V) characteristic of a diode is a nonlinear exponential curve. The nonlinear exponential relationship between the induced current (I) and the applied voltage (V) for a forward-biased diode can be expanded into a Taylor series, as follows:

$$I = b_0 + b_1 \cdot V + b_2 \cdot V^2 + b_3 \cdot V^3 + \ldots \quad (1)$$

whereas the same relationship for a reverse-biased diode can be expanded into another Taylor series with inverted odd-numbered terms, as follows:

$$I = b_0 - b_1 \cdot V + b_2 \cdot V^2 - b_3 \cdot V^3 + \ldots \quad (2)$$

where

I is the induced current flowing through the diode;

V is the applied voltage; and $b_0, b_1, b_2, b_3 \ldots$ are the Taylor-series coefficients.

Ideally, a combining device, such as a balance-unbalance transformer (balun), can be used to sum up the two currents of Eqs. (1) and (2) such that the odd-numbered terms can be cancelled out. In reality, the actual result can approximate very closely to this ideal case provided that the two diodes are properly biased. Since in this case the odd-numbered terms are cancelled out, a CSO is thus generated.

Furthermore, if the biases to the two diodes are unbalanced (for example, by using resistors of different resistance values or by using leakage current that causes the induced currents flowing through the two diodes to be unequal in magnitude), the two currents of Eqs. (1) and (2) can be combined in such a manner that only the second and third terms are left to serve respectively as the generated CSO and CTB. Therefore CSO and CTB are thus simultaneously generated.

Figure 7:
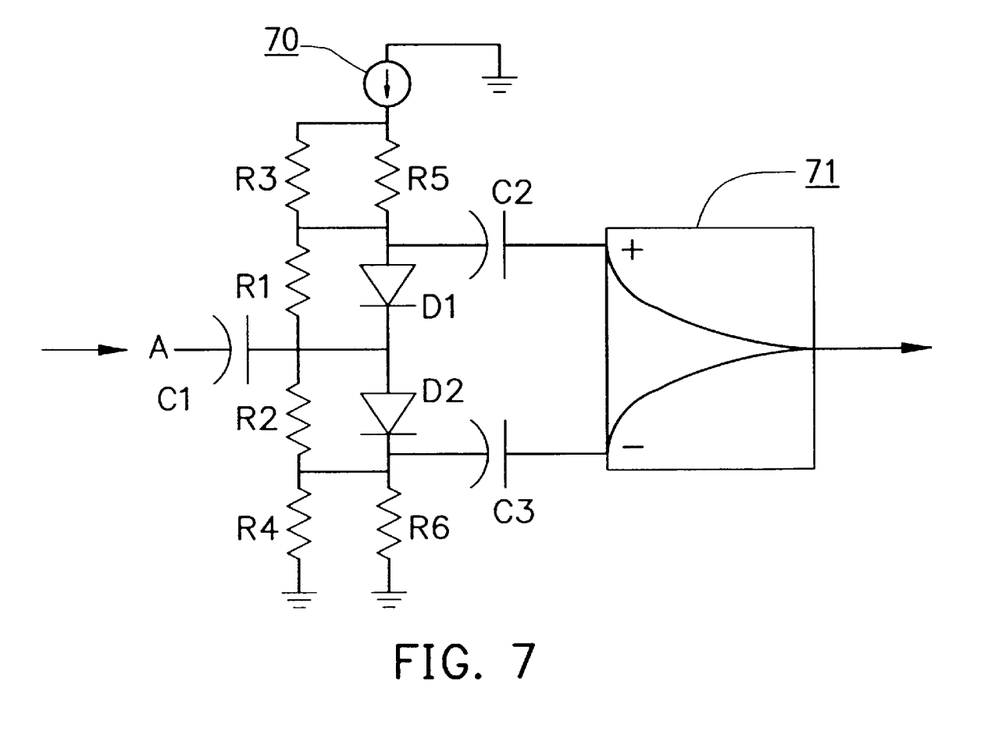
FIG. 7 is a schematic circuit diagram of a CSO/CTB generator which is utilized as a constituent element of the distortion-compensation circuit of the invention.

In the case of second-order distortion-compensation circuit of the invention, the odd-numbered harmonic components will be bounced back, which can cause interference to the signal on the main path. This problem can be solved by providing suitable isolation by, for example, using high-quality directional couplers, or arranging the amplifier to the preceding of the CSO/CTB generator CSO/CTB Generator FIG. 7 shows the detailed circuit structure of the above-mentioned CSO/CTB generator which is utilized as the primary constituent element of the distortion-compensation circuit of the invention. As shown, the CSO/CTB generator is composed of a number of resistors R1, R2, R3, R4, R5, R6, a number of capacitors C1, C2, C3, a pair of diodes D1, D2, a current source 70, and a balun 71. The input signal is received by this CSO/CTB generator at the node A. The diodes D1, D2 are used to produce CSO/CTB distortions for the input signal, which are preferably Schottky diodes since they are capable of producing large CSO/CTB distortions. The current source 70 and the resistors R1, R2, R3, R4, R5, R6 are arranged to serve bias means for providing suitable bias voltages for the diodes D1, D2.

In this preferred embodiment, two diodes (i.e., D1 and D2) are used to generate CSO/CTB distortions. However, the number of the diodes can be one or more than two. Fundamentally, the more the number of diodes used for the CSO/CTB generator, the larger the CSO/CTB distortions will be generated. However, this will also increase the insertion loss, which is undesired. Therefore, a tradeoff between these factors is to be chosen by the designer. In this preferred embodiment, the two diodes D1, D2 are connected in series, with the positive end of the diode D1 coupled via the capacitor C2 to the positive input end of the balun 71, and the negative end of the diode D2 coupled via the capacitor C3 to the negative input end of the same.

The balun 71 is capable of producing differences between the harmonics of odd-numbered orders and sums of the harmonics of even-numbered orders, then combining these differences and sums into a single composite output.

If the resistors R1, R2, R3, R4, R5, R6 are designed in such a manner that R1=R2, R3=R4, R5=R6, the CSO/CTB generator of FIG. 7 will serve solely as a CSO distortion generator without the generation of the CTB component.

If set to R1=R2, R3=R4, R5≠R6, it will cause the two diodes D1, D2 to be unequal in impedance, whereby the amplitude of the CTB component in the output of the CSO/CTB generator will be increased; otherwise, if set to R1≠R2, R3=R4, R5=R6, the current flowing through the first diode D1 will be unequal in magnitude to the current flowing through the second diode D2. This will also increase the amplitude of the CTB component in the output of the CSO/CTB generator.

Equalizer

Figure 8:
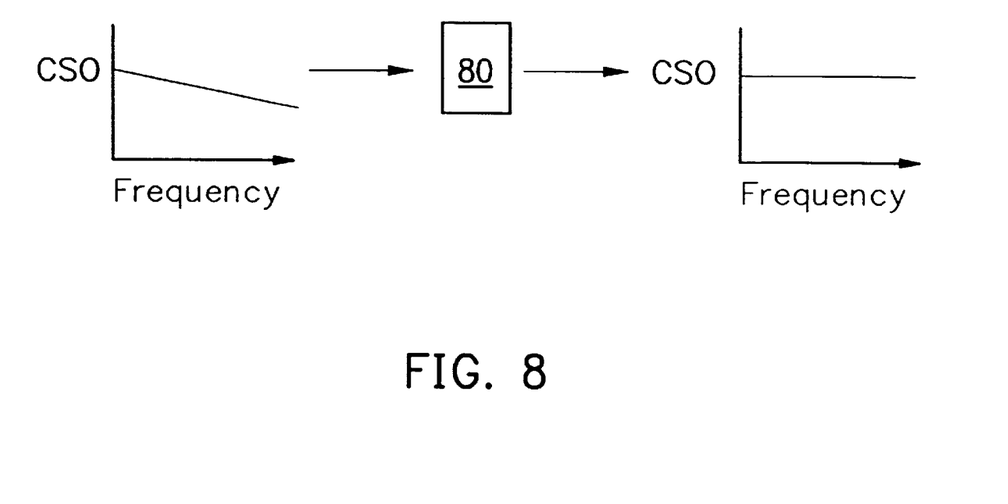
FIG. 8 is a schematic diagram used to depict the function of an equalizer which is utilized as a constituent element of the distortion-compensation circuit of the invention.
Figure 9:
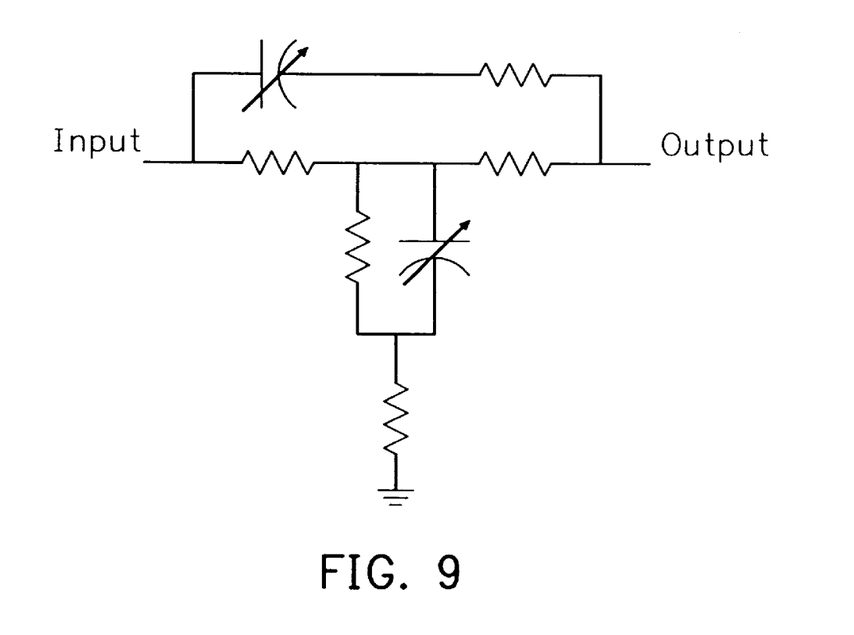
FIG. 9 is a schematic circuit diagram of an example of the equalizer.

The invention can be utilized on various multi-carrier communication system with a wide bandwidth, such as from 45 MHz (megahertz) to 860 MHz. In order to allow the amplitude response of the CSO to be substantially flattened over this bandwidth, an equalizer is used. FIG. 8 is a schematic diagram used to depict the finction of an equalizer, as designated by the reference numeral 80, which is utilized as an auxiliary constituent element in the distortion-compensation circuit of the invention. As shown, an input CSO to the equalizer 80, which is unequal in amplitude response over the bandwidth, can be substantially smoothly flattened over the bandwidth after passing through the equalizer 80. An example of the equalizer 80 is shown in FIG. 9. However, various other circuit structures for the equalizer 80 are possible.

Three preferred embodiments of the distortion-compensation circuit of the invention, which are constructed based on the above-mentioned elements, are disclosed in the following, respectively with reference to FIGS. 10, 11, and 12.

First Preferred Embodiment

Figure 10:
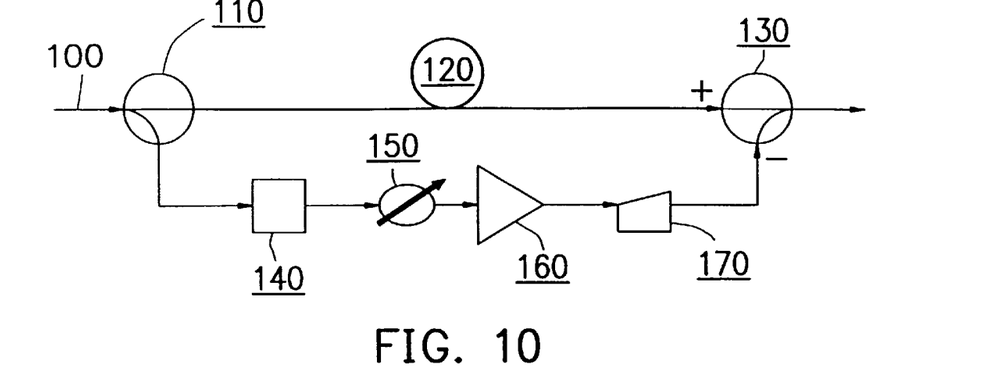
FIG. 10 is a schematic diagram of a first preferred embodiment of the distortion-compensation circuit according to the invention.

Referring to FIG. 10, the distortion-compensation circuit in accordance with the first preferred embodiment of the invention includes an input end 100 for receiving an input signal and a first directional coupler 110 provided at the input end 100, which serves as a splitting means for splitting the input signal into two parts and directing the two split signals respectively to a first path and a second path. In this preferred embodiment, the secondary signal is 10 dB less in power than the primary signal. The first path is arranged with a delay circuit 120; while the second path is arranged in cascade with a CSO/CTB generator 140, a voltage-controlled attenuator 150, an amplifier 160, and an equalizer 170. Further, a combining means, such as a second directional coupler 130, is used to combine the output of the first path and the output of the second path.

The delay circuit 120 can be adjusted to delay the primary signal by a time interval exactly equal to the time delay that will be caused by the secondary signal passing through the CSO/CTB generator 140, the voltage-controlled attenuator 150, the amplifier 160, and the equalizer 170 on the second path, so that the two output signals from the respective paths can meet at the second directional coupler 130 in synchronism.

On the second path, the secondary signal will first meet the CSO/CTB generator 140 whose circuit structure is as that shown in FIG. 7. In this preferred embodiment, the CSO/CTB generator 140 is devised in such a manner that R1=R2, R3=R4, R5≠R6 or R1≠R2, R3=R4, R5=R6, so as to provide CTB to the output of the CSO/CTB generator 140. This allows the CSO/CTB generator 140 to include both CSO and CTB in its output.

Referring back to FIG. 10, the output of the CSO/CTB generator 140 is subsequently transferred to the voltage-controlled attenuator 150 which is a circuit consisting of four PIN (positive-intrinsic-negative) diodes that can attenuate the input by an attenuation ratio that is adjustable by varying the magnitude of a control voltage input to the voltage-controlled attenuator 150. In particular, this voltage-controlled attenuator 150 is used to control the amplitude of the output of the CSO/CTB generator 140 to a suitable level.

The output of the voltage-controlled attenuator 150 is subsequently amplified by the amplifier 160. Onwards, the output of the amplifier 160 is transferred to the equalizer 170 which is capable of compensating for any undesired amplitude or phase characteristic in the output of the amplifier 160 so that the amplitude response for all the frequency components in the 45 MHz to 860 MHz bandwidth is substantially smoothly flattened. Subsequently, the output of the equalizer 170 is transferred to the negative input end of the second directional coupler 130 whose positive input end receives the delayed version of the primary signal from the delay circuit 120 on the first path. As a result, the second directional coupler 130 acts as a combiner whose output is the difference between the output of the first path and the output of the second path, whereby the signal in the output of the first path are offset by the compensating CSO/CTB components in the output of the second path. The output of the second directional coupler 130 is therefore a compensated version of the input signal.

Second Preferred Embodiment

Figure 11:
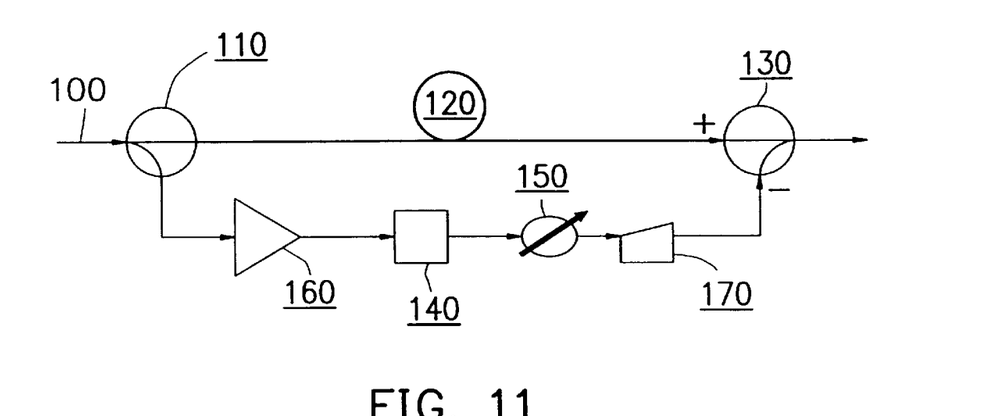
FIG. 11 is a schematic diagram of a second preferred embodiment of the distortion-compensation circuit according to the invention.

FIG. 11 is a schematic diagram of a second preferred embodiment of the distortion-compensation circuit according to the invention. In this figure, elements that are identical in structure and function to those in the first embodiment of FIG. 10 are labeled with the same reference numerals and will not be repeatedly described.

This embodiment differs from the previous one in that the cascaded order of the CSO/CTB generator 140, the voltage-controlled attenuator 150, the amplifier 160, and the equalizer 170 on the second path in the previous embodiment is here varied to the following order: the amplifier 160, the CSO/CTB generator 140, the voltage-controlled attenuator 150, and the equalizer 170. The arrangement of the amplifier 160 in a preceding order to the CSO/CTB generator 140 has the benefit of being able to increase the CSO/CTB output from the CSO/CTB generator 140.

Moreover, since the odd-numbered components of the input to the CSO/CTB generator 140 will be bounced back therefrom, which will cause interference to the signal transmitting on the main path, suitable isolation should be provided. The arrangement of the amplifier 160 in a preceding order to the CSO/CTB generator 140 has the additional benefit of being able to inhibit the bounce-back CTB by the isolation provided by the amplifier 160. However, it is to be noted that the amplifier 160 should be properly matched and provided with some attenuation means in order not to let the nonlinear characteristic of the amplifier 160 to distort the received signal.

Third Preferred Embodiment

Figure 12:
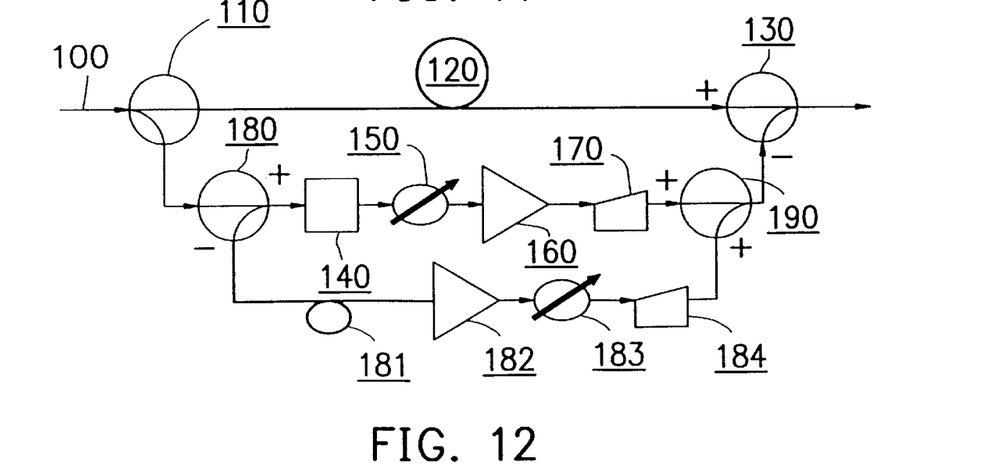
FIG. 12 is a schematic diagram of a third preferred embodiment of the distortion-compensation circuit according to the invention.

FIG. 12 is a schematic diagram of a third preferred embodiment of the distortion-compensation circuit according to the invention. In this figure, elements that are identical in structure and function to those in the previous embodiments are labeled with the same reference numerals and will not be repeatedly described.

This embodiment differs from the previous first embodiment in that a third path is further provided by using a third directional coupler 180 at the input end of the second path. The third directional coupler 180 is arranged in such a manner that its positive port is connected to the start of the second path and its negative port is connected to the start of the third path, as illustrated in FIG. 12. This arrangement will allow the bounce-back signal from the CSO/CTB generator 140 to be directed to the third path. In addition, a fourth directional coupler 190 is used to combine the output of the third path and the output of the second path. The CSO/CTB generator 140, the voltage-controlled attenuator 150, the amplifier 160, and the equalizer 170 are still arranged in the same order on the second path as those in the first embodiment. The third path is arranged in cascade with a delay circuit 181, an amplifier 182, a voltage-controlled attenuator 183, and an equalizer 184.

In this embodiment, the CSO/CTB generator 140 on the second path is set to generate CSO only (by setting R1=R2, R3=R4, R5=R6). This will cause the CTB component in the second-part signal to be bounced back from the CSO/CTB generator 140 to the third directional coupler 180, and subsequently directed by the third directional coupler 180 to the third path.

On the third path, the bounce-back CTB is first delayed by the delay circuit 181 so that the final output of the third path can be synchronized with the output of the second path. The output of the delay circuit 181 is then amplified by the amplifier 182 to a suitable amplitude. Subsequently, the output of the amplifier 182 passes through the voltage-controlled attenuator 183, and the output of the voltage-controlled attenuator 183 is equalized in amplitude response over the bandwidth. The CSO output from the second path and the CTB output from the third path are then combined by the fourth directional coupler 190. Subsequently, the output of the fourth directional coupler 190 is combined with the output of the first path by the second directional coupler 130 in a manner described earlier.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A distortion-compensation circuit for use in a wideband optical-fiber communication system comprising:

splitting means for receiving and splitting an input signal into a first signal and a second signal, said first signal being directed to a first path and said second signal being directed to a second path;

a CSO/CTB generator, arranged on said second path to receive the second signal, for selectively generating a compensating CSO/CTB output; and combining means, arranged at the end of said first and second paths, for combining the compensating CSO/CTB output from said CSO/CTB generator with the first signal so that the compensating CSO/CTB output can be used to offset the CSO/CTB distortions previously or subsequently generated in the optical fiber communication system.

2. The distortion-compensation circuit of claim 1, wherein said splitting means is a directional coupler having
   an input port connected to receive the input signal; and
   a pair of output ports respectively connected to said first and second paths.

3. The distortion-compensation circuit of claim 1, further comprising:
   a directional coupler coupled at the start of said second path to define a third path, said directional coupler being capable of directing a bounce-back signal from said CSO/CTB generator to said third path, said bounce-back signal being a CTB when said CSO/CTB generator is set to generate CSO only; and
   CSO/CTB combining means, arranged at the end of said second and third paths, for combining the CSO from said second path and the CTB from said third path to generate an output which represents a sum of the CSO from said second path and the CTB from said third path.

4. A distortion-compensation circuit for use in a wideband optical-fiber communication system comprising:
   splitting means for receiving and splitting an input signal into a first and a second signal, said first signal being directed to a first path and said second signal being directed to a second path;
   a CSO/CTB generator, arranged on said second path to receive the second signal, for selectively generating a compensating CSO/CTB output; and
   combining means, arranged at the end of said first and second paths, for combining the compensating CSO/CTB output from said CSO/CTB generator with the first signal so that the compensating CSO/CTB output can be used to offset the CSO/CTB distortions previously or subsequently generated in the optical fiber communication system, wherein said combining means is a directional coupler comprising:
      a positive input port connected to the end of said first path;
      a negative input port connected to the end of said second path, capable of inverting the phase of the output of said CSO/CTB generator on said second path, and
      an output port whose output is the difference between the first signal from said first path and the output of said CSO/CTB generator from said second path.

5. A distortion-compensation circuit for use in a wideband optical-fiber communication system comprising:
   splitting means for receiving and splitting an input signal into a first and a second signal, said first signal being directed to a first path and said second signal being directed to a second path;
   a CSO/CTB generator, arranged on said second path to receive the second signal, for selectively generating a compensating CSO/CTB output; and
   combining means, arranged at the end of said first and second paths, for combining the compensating CSO/CTB output from said CSO/CTB generator with the first signal so that the compensating CSO/CTB output can be used to offset the CSO/CTB distortions previously or subsequently generated in the optical fiber communication system, wherein said second path further comprises:
      a voltage-controlled attenuator, arranged on said second path and coupled to receive the output of said CSO/CTB generator, for selectively adjusting for an attenuation ratio for the output of said CSO/CTB generator;
      an amplifier, coupled to receive the output of said voltage-controlled attenuator, for amplifying the output of said voltage-controlled attenuator; and
      an equalizer, coupled to receive the output of said amplifier, for equalizing said amplitude response of the output of the amplifier over the bandwidth.

6. The distortion-compensation circuit of claim 5, further comprising on said first path:
   a delay circuit for delaying the first signal by a delay time substantially equal to the time delay of the second signal passing successively through said CSO/CTB generator, said voltage-controlled attenuator, said amplifier, and said equalizer.

7. A distortion-compensation circuit of claim 6, further comprising on said second path:
   an amplifier, arranged in a preceding order to said CSO/CTB generator to receive the second signal from said splitting means, for amplifying the second signal, the output of said amplifier being input to said CSO/CTB generator;
   a voltage-controlled attenuator, coupled to receive the output of said CSO/CTB generator, for variably adjusting for an attenuation ratio for the output of said CSO/CTB generator; and
   an equalizer, coupled to receive the output of said amplifier, for equalizing said amplitude response of the output of the amplifier over the bandwidth.

8. The distortion-compensation circuit of claim 7, further comprising on said first path:
   a delay circuit for delaying the first signal by a delay time substantially equal to the time delay of the second signal passing successively through said CSO/CTB generator, said voltage-controlled attenuator, and said equalizer.

9. A distortion-compensation circuit for use in a wideband optical-fiber communication system comprising:
   splitting means for receiving and splitting an input signal into a first and a second signal, said first signal being directed to a first path and said second signal being directed to a second path;
   a CSO/CTB generator, arranged on said second path to receive the second signal, for selectively generating a compensating CSO/CTB output;
   combining means, arranged at the end of said first and second paths, for combining the compensating CSO/CTB output from said CSO/CTB generator with the first signal so that the compensating CSO/CTB output can be used to offset the CSO/CTB distortions previously or subsequently generated in the optical fiber communication system;
   a directional coupler coupled at the start of said second path to define a third path, said directional coupler being capable of directing a bounce-back signal from said CSO/CTB generator to said third path, said bounce-back signal being a CTB when said CSO/CTB generator is set to generate CSO only; and
   CSO/CTB combining means, arranged at the end of said second and third paths, for combining the CSO from said second path and the CTB from said third path to generate an output which represents a sum of the CSO from said second path and the CTB from said third path, wherein said third path further comprises:
  a delay circuit, arranged on the third path and coupled to receive the bounce-back CTB from said directional coupler, for delay the CTB by a delay time that allows the final output from said third path to be synchronized with the output said second path at said CSO/CTB combining means;
  an amplifier, coupled to receive the output of said delay circuit, for amplifying the output of said delay circuit;
  a voltage-controlled attenuator, coupled to receive the output of said amplifier, for variably adjusting for an attenuation ratio for the output of said amplifier; and
  an equalizer, coupled to receive the output of said voltage-controlled attenuator, for equalizing said amplitude response of the output of the amplifier over the bandwidth.

10. A distortion-compensation circuit for use in a wideband optical-fiber communication system comprising:
  splitting means for receiving and splitting an input signal into a first and a second signal, said first signal being directed to a first path and said second signal being directed to a second path;
  a CSO/CTB generator, arranged on said second path to receive the second signal, for selectively generating a compensating CSO/CTB output, wherein said CSO/CTB generator further comprises:
    an input port for receiving said second signal;
    at least one pair of serially connected diodes including a first diode and a second diode, the negative end of said first diode being connected to the positive end of said second diode, the negative of said first diode and the positive of said second diode being connected together to said input port;
    biasing means for applying biases respectively to said first and second diode; and
    a balance-unbalance transformer having a positive input end connected to the positive end of said first diode and a negative input end connected to the negative end of said second diode, the output of said balance-unbalance transformer serving as the output of said CSO/CTB generator; and
  combining means, arranged at the end of said first and second paths, for combining the compensating CSO/CTB output from said CSO/CTB generator with the first signal so that the compensating CSO/CTB output can be used to offset the CSO/CTB distortions previously or subsequently generated in the optical fiber communication system.

11. The distortion-compensation circuit of claim 10, wherein said first and second diodes are each a Schottky diode.

* * * * *